May 31, 1938.  J. S. ZOOK  2,118,997
BATTERY HAND LAMP
Filed Jan. 14, 1937  4 Sheets-Sheet 1
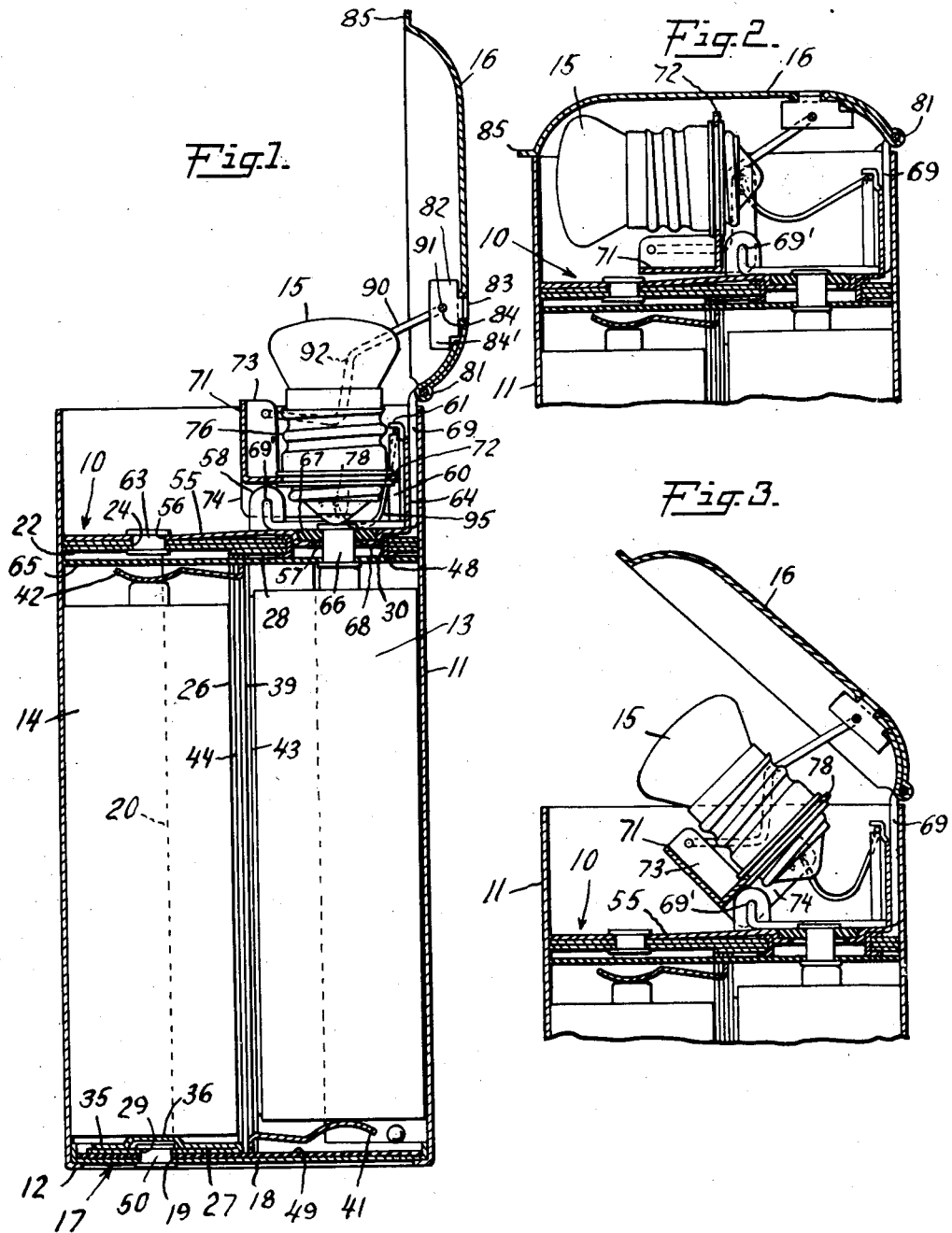
INVENTOR
John S. Zook
BY
Pennie, Davis, Marvin & Edmonds
ATTORNEYS May 31, 1938.　　　　J. S. ZOOK　　　　2,118,997
BATTERY HAND LAMP
Filed Jan. 14, 1937　　　4 Sheets-Sheet 2
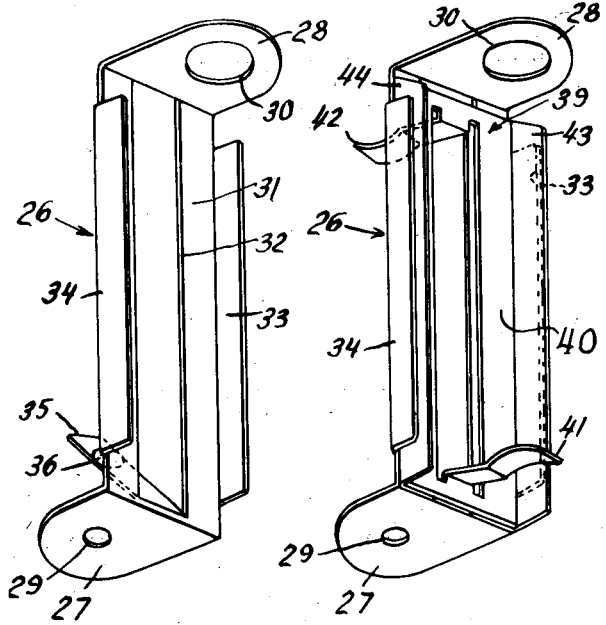
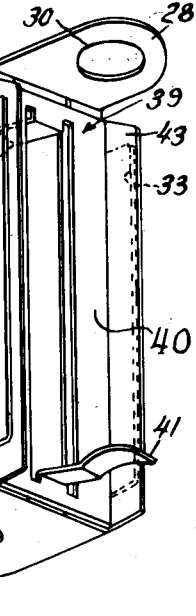
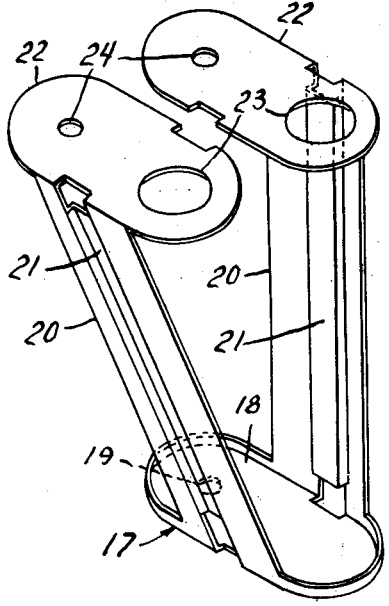
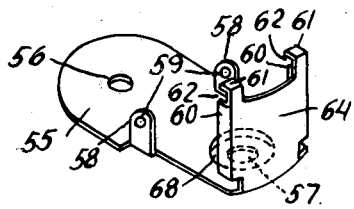
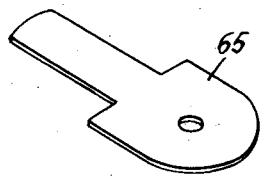
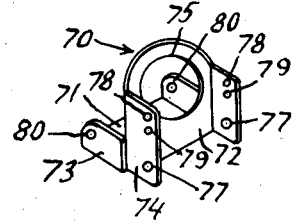
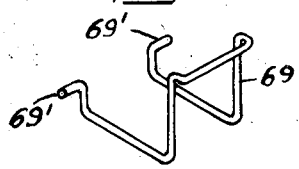
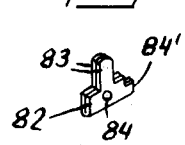
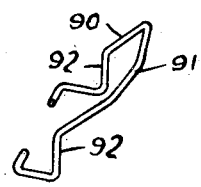
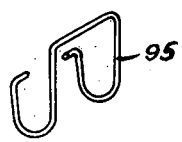
INVENTOR
John S. Zook
BY
Pennie, Davis, Marvin & Edmonds
ATTORNEYS May 31, 1938.  J. S. ZOOK  2,118,997
BATTERY HAND LAMP
Filed Jan. 14, 1937  4 Sheets-Sheet 3
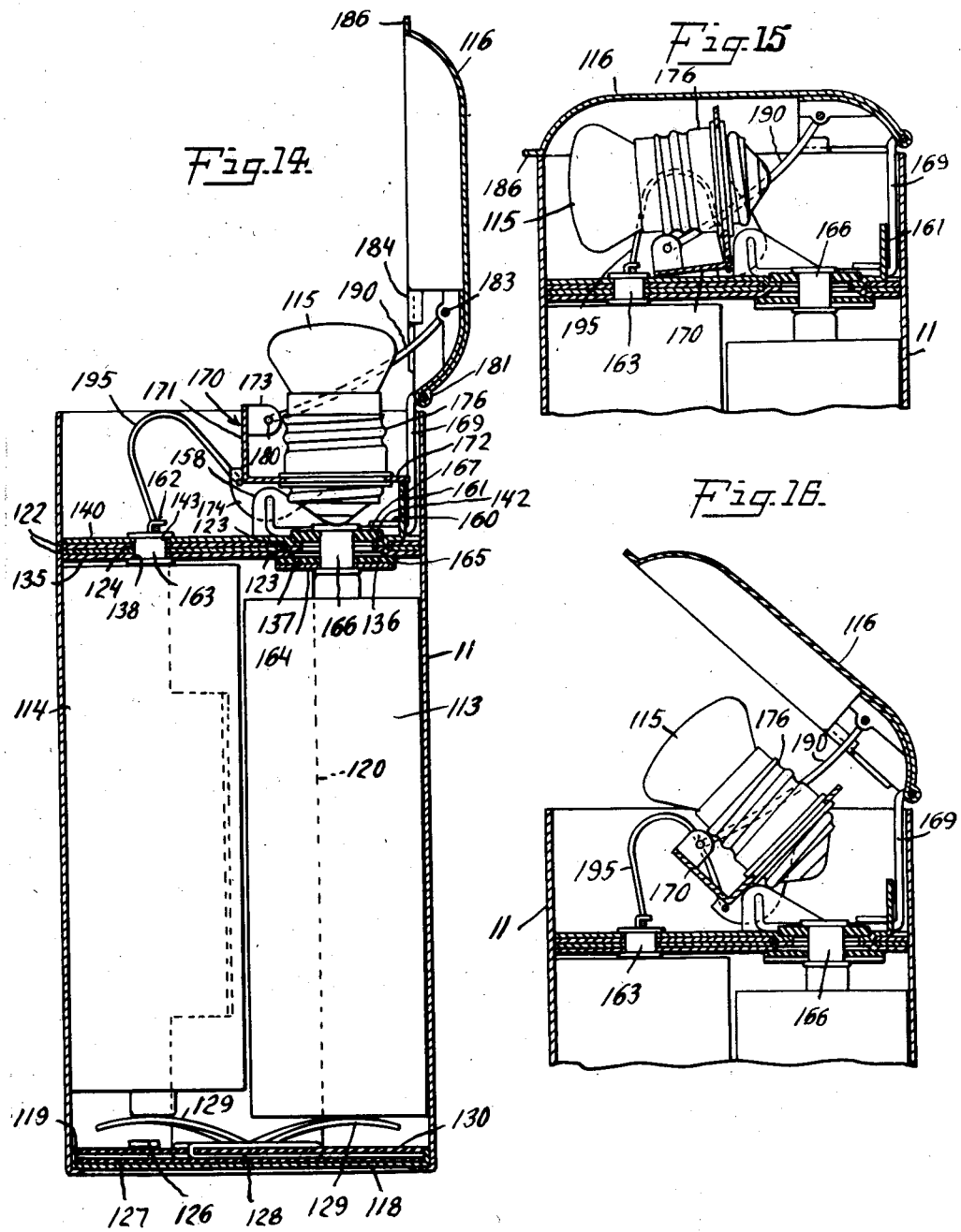
INVENTOR
John S. Zook
BY
Pennie, Davis, Marvin & Edmonds
ATTORNEYS May 31, 1938.  J. S. ZOOK  2,118,997
BATTERY HAND LAMP
Filed Jan. 14, 1937  4 Sheets-Sheet 4
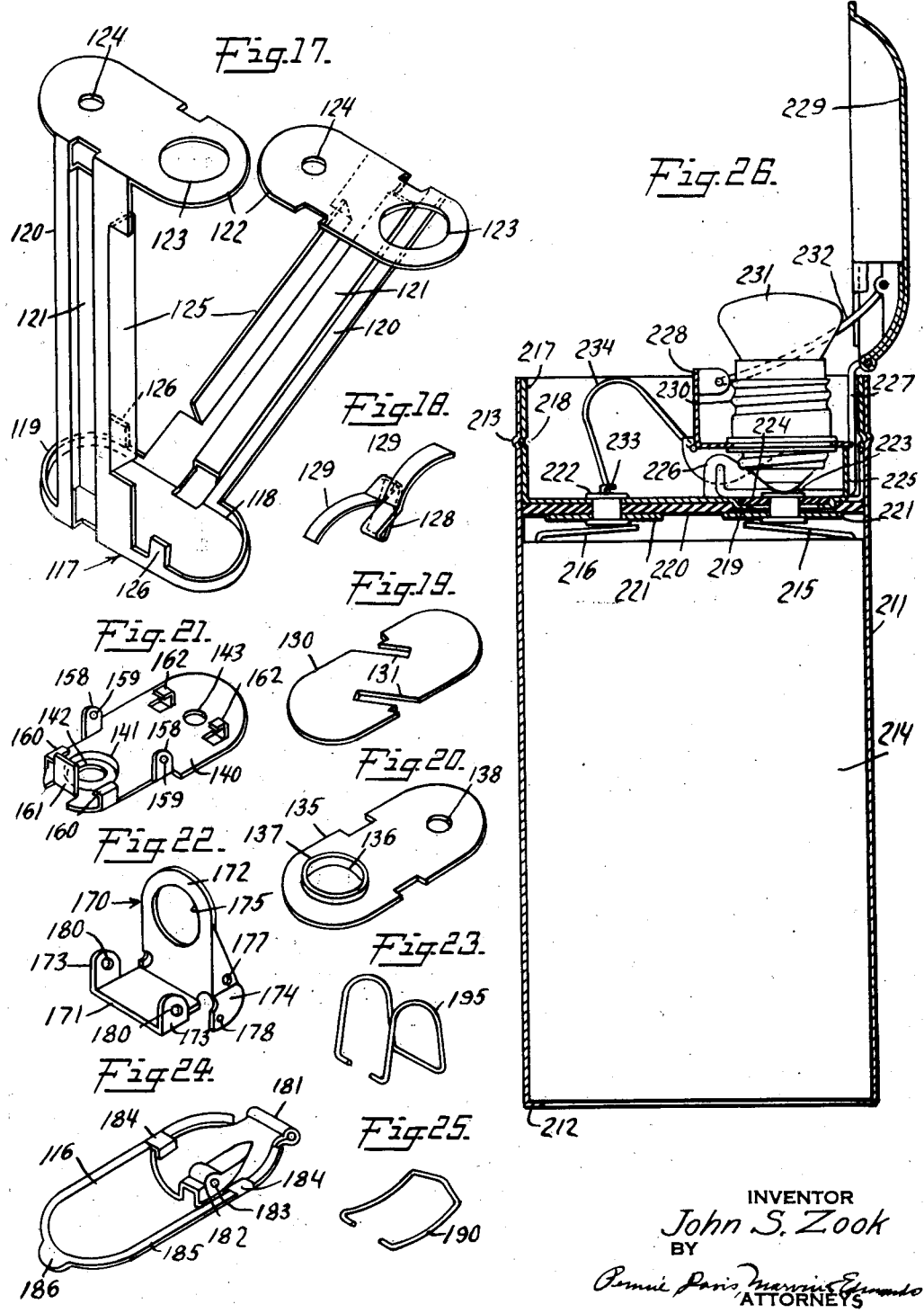
INVENTOR
John S. Zook
BY
ATTORNEYS Patented May 31, 1938

2,118,997

UNITED STATES PATENT OFFICE 2,118,997

BATTERY HAND LAMP

John S. Zook, Madison, Wis., assignor to Burgess Battery Company, Chicago, Ill., a corporation of Wisconsin Application January 14, 1937, Serial No. 120,461

12 Claims. (Cl. 240—10.67)

This invention relates to battery hand lamps and particularly those of the flat, pocket type wherein the incandescent lamp is made operative and inoperative by moving the cover into the open and closed positions with the thumb or finger and in which the movement to the operative and inoperative positions takes place with a snap. It relates to improvements in the constructions described and claimed in my United States Patent Nos. 1,701,093, 1,763,874, and 1,897,627 and in the Nygard Patent No. 1,792,547.

It is an object of the invention to provide a hand lamp of the character described which has improved operating characteristics and a longer useful life. A hand lamp is provided in which the snap action is improved, and the operation is easier and causes less wear upon the moving parts; and in which the incandescent lamp and the dry cells are replaceable individually after they have become worn out or exhausted.

Other objects and advantages will become apparent from the following description, which is to be taken in conjunction with the accompanying drawings, wherein Fig. 1 is a longitudinal sectional view of one form of the hand lamp of my invention as it appears when it is in the operative position;

Fig. 2 is a similar view of the head portion of the hand lamp of Fig. 1 when the same is in the inoperative position;

Fig. 3 is a view similar to Fig. 2 showing the hand lamp in an intermediate position between the operative and the inoperative positions;

Figs. 4 to 13 inclusive are perspective views of various component parts of the hand lamp of Fig. 1;

Figs. 14, 15, and 16 are views similar to Figs. 1, 2, and 3 of a modification of the hand lamp of this invention;

Figs. 17 to 25 inclusive are perspective views of component parts of the hand lamp of Fig. 15; and Fig. 26 is a longitudinal, sectional view of a further modification of the hand lamp of this invention.

The hand lamp of Fig. 1 consists of an operating assembly, indicated generally by the number 10, which may be inserted into open-ended case 11 by sliding longitudinally into the top end of the case until the bottom member of the supporting frame 17 for the assembly encounters flange 12 at the bottom of the case. Dry cells 13 and 14, indicated in Fig. 1, are mounted in the said supporting frame and are individually insertable and removable laterally with respect to the frame and are automatically connected in circuit by the act of insertion. An incandescent lamp 15 and a cover 16 are mounted pivotally at different points upon the upper portion of the frame. The lamp is adapted to be moved to the operative and inoperative positions and the cover is adapted to be moved to the open and closed positions with respect to the case. Means are provided for transmitting the movement of the cover to the bulb and the means are so arranged that the open and closed positions of the cover correspond to the operative and inoperative positions of the bulb respectively.

The frame 17 (see Fig. 4) is formed of sheet metal and comprises a bottom portion 18 having an opening 19 therein, side portions 20, stiffened by means of ribs or beads 21, and top portions 22 having openings 23 and 24 therein. The grooves which represent the opposite sides of ribs 21 accommodate the longitudinal seam in the side of case 11.

In Fig. 4 the frame is shown with the top portions 22 spread apart in order to facilitate the description, but in use they are juxtaposed as shown in Fig. 1. A second frame member 26 (see Fig. 5), is adapted to be contained in the main frame 17. Member 26 is substantially Z-shaped and is provided with lateral end portions 27 and 28, containing openings 29 and 30, respectively. The central portion 31 is separated into two parts by a central slot 32. Along the outside edges of the central portion 31 are flanges 33 and 34. A tongue 35, having a protuberance 36, projects from the junction of end portion 27 with central portion 31.

A spring contact member 39 is supported by frame 26 as is indicated in Fig. 6. Contact member 39 is a rectangular slotted member conforming substantially to the form of the central portion 31 of the frame member 26. Member 39 has two tongues or spring contacts 41 and 42 extending laterally in opposite directions at the ends thereof. The longitudinal portions of the contact member 39 are placed against the corresponding portions of frame member 26 and strips of insulation 43 and 44 are arranged between them and with portions projecting forwardly as shown in Fig. 6. The marginal flanges 33 and 34 are then folded tightly over central portion 40 of the contact member. Insulating strips 43 and 44 are of the proper size and material, for instance, varnished cambric, that it folds with marginal flanges 33 and 34 and electrically insulates the frame member 26 from the contact member 39.

The frame is shown in assembled relation in Fig. 1. Openings 23 of the top portions 22 of the main frame member 17 and opening 30 of the top portion 28 of frame member 26 coincide and are fixed together by means of a grommet 48. At the bottom of the frame, bottom portion 18 of the main frame 17 and bottom portion 27 of frame member 26 are arranged together with openings 19 and 29 coinciding. A piece of insulating material 49, preferably of hard fiber, is arranged between them, and all are fastened together by means of a rivet 50. The central portion 31 of frame member 26 divides the frame in two compartments, each of which is adapted to receive a dry cell. The spring contact 41 projects laterally into the bottom portion of one compartment and the second spring contact 42 projects into the top portion of the other compartment. Tongue 35 is folded down substantially flat with the bottom of the frame, and its protuberance 36 forms a third contact for the battery.

A plate or frame 55 (see Fig. 7) is mounted upon the top of the main frame 17 by means of a rivet 63 which passes through an opening 56 and through openings 24 in frame member 17. Frame 55 has two portions 58 projecting laterally from the middle portions of the side edges thereof, the projections 58 being turned upwardly in opposed relation to each other and being provided with mutually aligned holes 59. One end portion 64 of plate 55 is turned up and is formed with inwardly turned flanges 60 along the sides thereof and inwardly turned lugs 61 at the end thereof, the flanges and lugs forming slots 62 between them. Upright portion 64 is curved slightly as shown in order to increase its stiffness. The plate is provided with a second opening 57 and a surrounding depressed portion 68.

An insulating member 65 (see Fig. 8), having an opening adjacent one end thereof, is mounted upon the under side of the top of main frame 17. Insulating member 65 is shaped to pass through the slot 32 of the frame member 26 and above the slotted contact member 39. It is fastened in place by means of a metal grommet 66 which passes through it and is held at the other end by a fiber insulating washer 67. Washer 67 is supported in place by the depressed portion 68 of plate 55. Metal grommet 66 provides the fourth contact for the battery.

An irregularly shaped, stiff wire supporting member 69 (see Fig. 9) for the lamp holder and the cover is clamped in place upon plate 55 by flanges 60. Its laterally outwardly projecting end portions 69' extend through openings 59 and the adjacent portions extend downwardly until they substantially engage the upper surface of the plate 55 and they then extend along this surface lengthwise of the plate and beneath the edges of flanges 60 and then upwardly in engagement with the exterior side of vertical portion 64. When a point is reached slightly above the top of vertical portion 64, wire 69 again extends horizontally away from plate 55 a short distance and then the two side portions come together in a straight horizontal central portion.

A lamp holder 70 is mounted pivotally upon the end portions 69' of supporting member 69. The lamp holder (see Fig. 10) consists of a plate comprising two sections 71 and 72, substantially at right angles to each other. Each section has a pair of flanges numbered 73 and 74 respectively, along its sides. Section 72 has a large opening 75 adapted to receive a lamp socket 76. The socket has flanges which press against the opposite sides of the material surrounding opening 75 to hold the socket in position. Flanges 74 are provided with openings 77 which are adapted to receive the end portions 69' of supporting member 69, whereby the lamp is pivotally supported upon the plate member 55. Openings 78 or 79 in flanges 74 are adapted to receive the ends of a compression spring member 95. Flanges 73 have openings 80 adapted to receive the ends of a link member 90. The lamp 15 is in threaded engagement in the socket and is arranged so that in the operative position its end terminal makes contact with metal grommet 66 as shown in Fig. 1, and in the inoperative position it is disconnected from grommet 66, as shown in Fig. 2.

The dished, oval-shaped cover member 16 is mounted pivotally upon the central portion of supporting wire 69 and is adapted to form a reflector for the lamp 15 when in the open position, as shown in Fig. 1, and a cover for the hand lamp when in the closed position, as shown in Fig. 2. One end of the cover is provided with a lip 85 which extends beyond the side of case 11 and may be engaged by the thumb or finger for operating the hand lamp. The opposite end portion of the cover 16 is folded back upon itself to form a loop 81 around the central portion of supporting wire 69, the two parts cooperating to provide the desired pivotal support. A coupling member 82 is fastened to the cover 16 adjacent the supported end of the cover. The coupling member 82 (see Fig. 11) comprises a shaped metal blank folded upon itself to form projecting portions 83 which pass through a slot in the cover and are folded apart against the exterior surface of the cover. The portion of member 82 upon the interior side of the cover has an opening 84 therein. One end of this member is notched as at 84' to receive and hold the end of the looped portion 81 of the cover in position.

A substantially U-shaped wire link member 90 (see Fig. 12) is adapted to transmit the movement of cover 16 to the lamp holder. The central portion of link 90 passes through the opening 84 of the coupling member 82 and the ends are engaged in openings 80 of the lamp holder 70. A rather abrupt bend 91 is provided at the center of the U to prevent relative movement between the coupling 82 and the link 90. Downwardly bent portions 92 are formed substantially midway of the legs of the U to provide access for screwing the lamp 15 in and out of the socket 76. The link 90 is arranged so that when the cover is in the open position the lamp is operative and when the cover is closed the lamp is inoperative. The lamp and the cover are maintained in substantially parallel relation in all positions, and in the inoperative position a surface of lamp holder 70 rests against plate 55 and the edges of cover 16 rest against the top edges of case 11, as shown in Fig. 2.

A spring member 95 which is also substantially U-shaped, (see Fig. 13) is held at its central portion in slots 62 of plate 55 and its ends are engaged in openings 78 of lamp holder 70. The spring member 95 is arranged so as to be bowed in longitudinal compression in all the positions of lamp holder, the compression being greatest when the lamp holder is in a position intermediate and substantially midway between the operative and the inoperative positions, as shown in Fig. 3. Such relation is secured by arranging openings 78 so that, as the lamp holder is pivoted upon support 69, openings 78 swing in an arc which approaches slots 62 most closely at a position of openings 78 corresponding to the midway position of the lamp holder than at other times. When the lamp holder is moved from the operative position to a point slightly beyond the midway position, spring 95 causes it to move with a snap into the inoperative position, and vice versa. In addition, when the lamp holder is in either the operative or the inoperative position, spring 95 maintains it firmly in that position. The spring may be connected to openings 79 instead of 78 if it is desired to adjust the compression upon the spring to a lower value.

The assembly 10 provides two open-sided compartments, and dry cells 13 and 14 are arranged in these compartments in electrical connection with the bottom and top terminals therein. The dry cells are both arranged with their positive terminals toward the top of the assembly. The negative electrode of cell 14 is in contact with terminal 35 and the positive electrode is in contact with terminal 42 while the negative and positive electrodes of cell 13 are in contact with terminals 41 and 66, respectively. The two cells are connected together in series arrangement by contact member 39, which, as explained heretofore, is integral with spring contacts 41 and 42. The positive terminal of cell 13 and the negative terminal of cell 14 are the positive and negative terminals, respectively, of the battery. The negative terminal is in continuous connection with the threaded terminal of the lamp through terminal 35, central and top portions 31 and 28 of frame member 26, the top portions 22 of main frame 17 and plate 55, which are in contact with each other and are connected together by grommet 48 and rivet 63, then through support wire 69, lamp holder 70 and socket 76. The positive terminal of the battery is in continuous connection with grommet 66.

In operating the hand lamp the cover is moved by the thumb or finger from the closed or the open position, as the case may be, until the lamp holder and cover have reached a point somewhat beyond the midway position, after which the spring 95 causes them to move into the new position with a snap. In the operative position of the lamp the end terminal of the lamp is in contact with grommet 66, as shown in Fig. 1, and the circuit is completed through the lamp. In the inoperative position of the lamp the connection between the grommet 66 and the end terminal of lamp 15 is broken as shown in Fig. 2.

Upon the exhaustion of one or both of the cells, the operating assembly 10 may be slipped out of the case 11 by pressing on the bottom 18 of the frame and pushing it up far enough to provide a grip upon the top portion, and then withdrawing it the balance of the way. The exhausted cell or cells may be slipped laterally out of the frame and fresh ones inserted. Spring contacts 41 and 42 maintain the cells firmly in position. An indentation is provided in case 11 adjacent the bottom thereof, just above the bottom members of the supporting frame 17. The resulting projection on the inside of the case prevents the operating assembly from coming out of the case at undesired times.

In the modification shown in Figs. 14 to 26 inclusive, the dry cells are arranged one upright and the other reversed instead of both being upright. The same open ended case 11 may be used. An open-sided frame 117 which is insertable into the open end of the case is shown in Fig. 17. The frame comprises a bottom portion 118, side portions 120, stiffened by means of longitudinal ribs 121, and top portions 122 having large openings 123 adjacent one end thereof and small openings 124 adjacent the other end thereof. In addition, the longitudinal side portions have turned-in flanges 125 thereon which are adapted to maintain the dry cells in position. The bottom member 118 has a flange 119 extending upwardly from its edges and a pair of lugs 126 project upwardly from the flange 119.

An oval-shaped disc 127 of insulating material is placed against the interior surface of bottom member 118 (see Fig. 14). A bottom spring contact 128, which is adapted to connect the adjacent terminals of the dry cells together, is mounted upon insulating disc 127. Contact 128 (see Fig. 18) is in the form of a strip of spring metal which is folded upon itself in two places to form a looped portion and two end portions 129 which extend upwardly at an angle and are curved so as to permit the ready lateral insertion of the dry cells and to maintain pressure against the dry cell terminals. A second oval-shaped disc of insulating material 130 (see Fig. 19) is employed to maintain the spring contact 128 in position. Disc 130 is provided with slots 131 extending diagonally inward from opposite edges, and the looped portion of spring contact 128 is looped around the central portion of disc 130 which is between slots 131.

After the members 127, 128, and 130 are in position in the bottom frame member 118, lugs 126 are turned inwardly against the top surface of disc 130 and the members are thereby held firmly in position.

At the top of the frame, the top members 122 are arranged to coincide with each other and a metal plate 135 (see Fig. 20) is arranged beneath top frame members 122. Plate 135 has a relatively large opening 136 with a substantially perpendicular flange 137 around its periphery, adjacent one end. A relatively small opening 138 is provided adjacent the opposite end. Flange 137 extends upwardly into openings 123, and opening 138 coincides with openings 124.

A second plate 140 having a shape generally similar to that of plate 135, is arranged above top frame members 122. Plate 140 is shown in Fig. 21 and has a relatively large opening 141 adjacent one end, the opening having a depressed portion 142 around its periphery. The plate 140 also has a relatively small opening 143 adjacent the opposite end. This plate is arranged with the flange 142 extending downwardly into opening 123 of the top frame members 122 and opening 143 coinciding with openings 124 of the top frame members.

The two plates 135 and 140 and the top frame members 122 are fastened together rigidly and maintain an electrical connection with one another by means of the metal grommet 163. A second metal grommet 166 passes through the relatively large openings in the two plates and the top frame members and has its ends exposed and adapted to cooperate with a terminal of the battery and the end terminal of the lamp in the manner described in connection with the first modification of the hand lamp. Grommet 166 is held in position out of electrical contact with plates 135 and 140 and top members of the frame by means of insulating washers 165 and 167. Washer 167 is mounted in the depressed portion of plate 140 surrounding the opening 141. A metal washer 164 may be mounted against the under surface of insulating washer 165.

Plate 140 has two ears 158 projecting from the side edges thereof and turned upwardly in opposed relation to each other, these projecting portions having openings 159 therein. Plate 140 also has two lugs 160 projecting from the sides thereof adjacent one end, the lugs being turned upwardly and inwardly toward each other to form hook-shaped clamps for clamping the rod-shaped member upon which the cover and the lamp holder are pivoted. The adjacent end portion of the plate 140 is turned upwardly to form a lug 161 which forms a stop for the lamp holder in the operative position. Additional hook-shaped lugs 162 are punched out of plate 140 adjacent the opposite end thereof and are turned upwardly from the plate and their end portions are turned substantially horizontally toward the far end of the plate. The lugs 162 form an anchoring means for the spring which imparts the snap action to the lamp holder and cover.

A wire or rod-like supporting member 169 for the lamp holder and the cover, similar to the supporting member 69 shown in Fig. 9, is clamped against the upper surface of plate 140 by means of clamping lugs 160. The end portions extend through opening 159 and support the lamp holder in pivotal relation, and the mid-portion of supporting member 169 is in elevated relation to plate 140 and is adapted to support the cover in pivotal relation.

The lamp holder 170 (see Fig. 22) is, in general, similar to the lamp holder 70 shown in Fig. 10 and comprises two sections 171 and 172 arranged at substantially right angles to each other. Section 171 has inwardly turned lugs or flanges 173 at the sides thereof. Flanges 173 have openings 180 therein, the openings being arranged in opposed relation to each other. Section 172 has flanges 174 turned outwardly from opposite sides thereof, at the portion adjacent the angle between sections 171 and 172. Flanges 174 have openings 177 in opposed relation to each other, which are adapted to receive the end portion of the supporting member 169. These flanges also have openings 178, which are adapted to receive the end portions of spring member 195 which causes the snap action of the lamp holder and the cover. Section 172 has a large opening 175 therein adapted to receive a lamp socket 176 therein in a manner similar to that described in connection with the form of the invention shown in Fig. 1. The lamp 115 is mounted in threaded engagement with socket 176.

The spring member 195 (see Fig. 23) has its end portions engaged in openings 178 of the lamp holder and its mid-portion held in position by hook-shaped lugs 162 projecting from plate 140. Spring member 195 is held in fixed position adjacent the end of plate 140 opposite to that at which the corresponding spring member 95 of Fig. 1 is anchored and the spring is anchored at a point adjacent to the plate instead of at a point elevated from the plate.

The cover 116 (see Fig. 24) is of the same general shape as the cover 16 of Fig. 1 and has flanges 185 around the edges thereof and a lip 186 at one end. At the opposite end the material is turned back on itself to form a loop 181 adapted to receive wire supporting member 169, the turned-back portion being folded against the inner side of the cover and having a portion or bead 182 projecting laterally away from the cover. Portion 182 has a transverse opening 183 formed therein, this opening being adapted to receive the mid-portion of a link member 190 which connects the cover with the lamp holder and transmits a pivotal motion from one to the other. The edges of the cover adjacent this end thereof have projections 184 extending laterally therefrom, these projections being turned inwardly toward each other and folded over the turned-in end portion of the cover to hold the same in place.

The link member 190 (see Fig. 25) has its mid-portion passing through opening 183 and its end portions extending through openings 180 of the lamp holder and is adapted to transmit the pivotal motion of the cover to the lamp holder and vice versa in the same manner as described in connection with the construction of Fig. 1. The link member 190 is not of angular form like link member 90 but is bowed downward slightly, as is shown clearly in Fig. 14, in order to provide access to the lamp for replacing the same when it is exhausted.

The operation of the hand lamp of Fig. 14 is similar to that of Fig. 1. Lip 186 of cover 116 is engaged by the thumb or finger, the cover moved to the open position, and the lamp holder is moved simultaneously to the operative position. In this movement, spring 195 passes through the condition of greatest compression when the lamp holder is substantially midway between the operative and the inoperative positions. It is necessary to exert pressure against the cover to move it toward the open or closed position only until this midway position of the lamp holder is reached after which the spring 195 causes the lamp holder, and with it the cover, to move to the desired position with a snap.

Dry cell 113 is arranged with its positive terminal contacting grommet 166 and its negative terminal engaging one end of spring contact 128, and the other dry cell 114 is arranged with its positive terminal engaging the other end of spring contact 128 and its negative terminal in contact with grommet 163. The entire operating assembly may be inserted and removed longitudinally from case 11 and the dry cells may be inserted and removed laterally from the open sides of frame 117. It is understood, of course, that dry cells 113 and 114 may both be reversed in position from the positions shown in Fig. 14, as long as the series connection is maintained. In the construction of Fig. 14 as in that of Fig. 1, the threaded terminal of the lamp is in continuous electrical connection with the negative terminal of the battery. The connection is through grommet 163, plate 140, the two members 169 and 195 which connect the plate to the lamp holder, and through the lamp holder and lamp socket. The positive terminal of the battery is in continuous electrical connection with grommet 166, the exposed top end of which is connected and disconnected from the end terminal of the lamp in the operative and the inoperative positions respectively of the same.

In the modification of the invention which is shown in Fig. 26 the battery is insertable lengthwise into the open end of the case and the operating mechanism of the hand lamp is contained in a cup which is insertable in the case at the top of the battery, the circuit connection for the operation of the hand lamp being made automatically by the insertion of the cup. The case 211 is of the same oval shape as the case 11 of Fig. 1 and has an in-turned flange 212 at the bottom. It is provided with relatively short outwardly projecting ridges 213 extending laterally of the case adjacent the top and upon opposite sides thereof. The battery 214 is of the ordinary flattened oval type having spring terminals 215 and 216 projecting from the top thereof. The battery and the case are shaped laterally to conform to each other and the battery may be inserted into the open end of the case, when it will slide to the bottom of the case where the bottom of the battery engages the in-turned flange 212.

A metallic cup-shaped member 217 conforms laterally with the shape of the case 211 and is adapted to be inserted into the open top of the case above the battery 214. The cup has laterally extending, outwardly projecting ridges 218 which are adapted to be engaged in the grooves formed by the reverse sides of ridges 213 of case 211, whereby the cup 217 is maintained in position in the case. The cup has two openings in the bottom thereof, each opening being located approximately half way between the middle of the cup and the opposite ends thereof. The material of the cup surrounding one of the openings thereof is depressed downwardly to form depressed portion 219. A sheet-form member of electrical insulating material 220 is arranged against the exterior surface of the bottom of the cup and conforms to the lateral shape of the cup. This member has openings therein coinciding with the openings in the bottom of the cup, one of the openings being of a size adapted to accommodate the depressed portion 219 of the cup. Metallic washers 221 are arranged against the bottom of insulating member 220 adjacent the openings and the bottom of the cup, the insulating member 220 and the washers 221 are held firmly together by means of metal grommets 222 and 223. The top portion of grommet 223 is held in position by a washer of electrical insulating material 224 which is held in the depressed portion 219 of the bottom of the cup. A lug 225 is struck up from the bottom of the cup to form a stop for the lamp holder in the operative position.

The bottom of the cup has lugs 226 struck up from it, these lugs having openings to accommodate the end portions of wire supporting member 227 for the lamp holder and the cover. The lamp holder 228 and the cover 229 are of the same construction as the lamp holder and cover of Fig. 14. The lamp holder carries lamp socket 230 and a lamp 231 is threaded into the socket. A link member 232 is connected between the lamp holder and the cover and transmits the pivotal motion of one to the other. A pair of lugs 233 are struck up from the bottom of the cup and a spring member 234 is connected between these lugs and the lamp holder in the same manner as described in connection with Fig. 14, whereby the spring 234 maintains the lamp holder and the cover firmly in their different positions and causes them to move into these positions with a snap action.

The operation of this modification of the invention is the same as that of the constructions of Figs. 1 and 14. Upon the insertion of the cup 217 into the case 212 the terminals 215 and 216 of the battery make electrical connection with the grommets 223 and 222 automatically. From the grommet 222 the electrical circuit continues through the bottom of the cup, the supporting structure for the lamp holder, the lamp holder, the lamp socket and the threaded terminal of the lamp. The other grommet 223 is in direct electrical connection with the end terminal of the lamp when the latter is in the operative position. Upon the exhaustion of the battery the latter may be replaced by pressing upon its bottom end which is exposed in the open end of the case 211. The disengagement of the ridges 218 of the cup from the grooves of the case is readily accomplished by a mild pressure upon the bottom of the battery. The engagement of the cup with the case is sufficient, however, to prevent the cup and the battery from coming out of the case under normal conditions of handling and use. After the disengagement of the cup from the case, the cup and the battery may be removed readily from the case and a fresh battery may be inserted and the cup replaced.

In the hand lamp of the earlier patents referred to heretofore the cover is a combination of cover and lamp holder and is supported upon cams which are pressed against the supporting surface and slide thereon when the lamp holder is moved from one position to the other. In addition, the dry cells are not individually replaceable. In the hand lamp of the present invention, the lamp holder and the cover are each mounted and pivoted upon a different fixed support and substantially no friction is encountered in moving the lamp from one position to another. As a result the snap action is improved and there is no tendency for the lamp to stop at an intermediate position when the pressure is removed. In addition, less effort is required to move the lamp and there is no tendency for the operating parts to jam because of friction and become twisted and bent because of excessive pressure being applied to effect movement. As a result, the parts do not become worn and they remain in their proper relative positions and the cover remains fitted against the top edges of the case for a long period of use. These features together with the feature which permits individual replacement of the dry cells when they become exhausted result in a hand lamp which has a long useful life.

The terms "top", "bottom", "side", "inward", and similar terms are used herein in a relative sense for the purpose of simplifying the description and are not intended necessarily as limitations, as will be evident. In addition to the several modifications described it will be apparent that various changes may be made in the form and arrangement of the various parts without departing from the spirit of the invention.

I claim:

1. A battery hand lamp comprising, in combination, an open-ended case, a battery in said case, a frame fitting laterally within said case at one end of said battery and adjacent the open end of said case, said frame having two projections extending upwardly therefrom and arranged in opposed relation to each other, said projections each having an opening therein, a substantially U-shaped rod clamped upon the upper surface of said frame, the legs of said U being bent at an angle in such manner that the mid-portion of said U is in elevated position with respect to the frame and the end portions extend through the openings in the upward projections, a cover for the case mounted in freely pivotal manner on the mid-portion of said U, an incandescent lamp holder mounted in freely pivotal manner on the end portions of said rod, said lamp holder comprising portions disposed angularly to each other, a lamp socket and a lamp mounted upon one angular portion of said lamp holder, a link member connected between the cover and the other angular portion of the lamp holder for transmitting the pivotal motion from the cover to the lamp holder, the link member being so arranged that the operative and inoperative positions of the lamp holder correspond to the open and closed positions of the cover respectively, and a wire spring member clamped at one end to the frame and connected at the other end to the lamp holder, said spring member being bowed in compression and being connected to the lamp holder at such a point thereon that the compression on said spring member is greatest when the lamp holder is in an intermediate position between the operative and inoperative positions, whereby the cover and lamp holder are maintained in their respective positions under pressure and are moved into said positions with a snap from said intermediate position.

2. A battery hand lamp comprising, in combination, an open top case, a battery in said case, a frame in the case at one end of the battery, said frame having two rod-shaped supports mounted thereon, a cover for said case mounted pivotally upon one of said supports, a lamp holder mounted pivotally upon the other of said supports, a link-member connected between the cover and the lamp holder for transmitting the pivotal motion of one to the other, the operative and inoperative positions of the lamp holder corresponding to the open and closed positions of the cover respectively, and a spring member connected between a fixed point on the frame and the lamp holder, said spring member being in compression and being so arranged that the compression thereon is greatest when the lamp holder is in a position between the operative and inoperative positions thereof.

3. The construction of claim 2 in which the cover is of shaped metal adapted to fit over the open end of the case and has a lip at one end thereof and the other end portion thereof turned back upon itself to form a loop adapted to receive the rod-shaped support, the turned-back portion being folded against the underside of the cover and having a laterally projecting bead, said bead having a transverse opening therein adapted to receive the link member.

4. The construction of claim 2 in which the link member is of substantially U-shape, the legs of the U passing opposite sides of the lamp, said legs being curved so as to provide ready access to the lamp for the purpose of replacing the same.

5. In a device of the class described, an open-ended case, a battery in said case, a plurality of fixed, spaced supports mounted in the case adjacent the open end thereof, a cover for the case and a lamp holder mounted pivotally upon said supports respectively, and adapted to be pivoted into predetermined positions, means for connecting the cover with the lamp holder and transmitting the pivotal movement from one to the other, and a spring member connected between one of the pivotally mounted members comprising the cover and the lamp holder and a fixed point in the case, said spring member being in a state of stress and being so arranged that the stress thereof is greatest when the lamp holder is in a position between said predetermined positions.

6. In a device of the class described, an open-ended case, a plate adjacent the open end of said case, two fixed supports mounted on said plate, a cover for the case and a lamp holder mounted pivotally on said supports respectively, and being adapted to be pivoted into predetermined positions, means connecting the cover to the lamp holder for transmitting the pivotal motion from one to the other, said lamp holder having surfaces substantially at right angles to each other, said surfaces being adapted to engage the plate in the different positions of the lamp holder respectively to provide stops for the lamp holder.

7. A hand lamp comprising an open-ended case, a frame slidable longitudinally into said case, said frame having an open-sided compartment therein, terminals exposed in said compartment, said compartment being adapted to receive a plurality of dry cells by lateral insertion therein between the terminals, spaced supports mounted on the frame adjacent the open end of the case, a cover for the case and a lamp holder mounted pivotally on the supports respectively, means interconnecting the cover and the lamp holder for transmitting the pivotal motion of one to the other, and spring means connected between one of said pivotally mounted members and the frame for holding the lamp holder firmly in the operative and the inoperative positions thereof and causing the lamp holder to move into said positions with a snap from an intermediate position.

8. A separable operating assembly for a hand lamp case comprising a frame, said frame having an open-sided compartment therein, terminals exposed in the compartment, said compartment being adapted to receive a battery by lateral insertion therein into engagement with the terminals, spaced substantially fixed supports mounted on the frame adjacent one end of the compartment, a cover for the hand lamp case and a lamp holder mounted pivotally on the supports respectively and being adapted to be pivoted into predetermined positions thereof, means interconnecting the cover and the lamp holder for transmitting the pivotal movement of one to the other, and spring means connected between the lamp holder and the frame for holding the lamp holder in the predetermined positions thereof and causing the lamp holder to move into said positions with a snap from an intermediate position.

9. In a device of the class described, a frame carrying two fixed, spaced supports, a lamp holder and a cover mounted in freely pivotal manner on the supports respectively and being adapted to be pivoted into predetermined positions, a link member connecting the cover and the lamp holder for transmitting the pivotal motion from one to the other, and a spring member connected between said frame and one of said pivotally-mounted members, said spring member being adapted to hold said pivotally-mounted members in said predetermined positions and to move said pivotally-mounted members into said positions with a snap from an intermediate position.

10. In a device of the class described, an open-ended case, separated substantially fixed supports mounted in the case adjacent the open end thereof, a cover for the case and a lamp holder mounted pivotally on the supports respectively, means interconnecting the cover and the lamp holder for transmitting the pivotal motion of one to the other, and a lamp in the lamp holder, said connecting means being so arranged that the cover and the axis of said lamp are substantially parallel in all positions of the two.

11. A battery hand lamp comprising in combination, an open-ended case, a battery in said case, a cup in the case at one end of said battery, said cup and battery having lateral shapes conforming to the lateral shape of the case and being separately insertable and removable from the open end of the case, substantially fixed supports mounted in the cup, said supports being spaced from each other, a cover for the case and a lamp holder mounted pivotally on the supports respectively and being adapted to be pivoted into predetermined positions thereof, means interconnecting the cover and the lamp holder for transmitting the pivotal movement of one to the other, and spring means connected between the lamp holder and the cup for holding said lamp holder in the predetermined positions and causing the lamp holder to move into said positions with a snap from an intermediate position.

12. The construction of claim 11 in which electric terminals are exposed on the bottom of the cup and on the top of the battery, and the terminals of the cup make electrical connection with the terminals of the battery when the cup and the battery are in position in the case.

JOHN S. ZOOK.